(12) United States Patent
Fried

(10) Patent No.: US 12,487,855 B2
(45) Date of Patent: Dec. 2, 2025

(54) REPLACING STALE CLUSTERS IN A CLUSTER POOL

(71) Applicant: Red Hat, Inc., Raleigh, NC (US)

(72) Inventor: Eric Fried, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 777 days.

(21) Appl. No.: 17/850,573

(22) Filed: Jun. 27, 2022

(65) Prior Publication Data
US 2023/0418672 A1 Dec. 28, 2023

(51) Int. Cl.
*G06F 9/50* (2006.01)
*G06F 9/445* (2018.01)

(52) U.S. Cl.
CPC ........ *G06F 9/5027* (2013.01); *G06F 9/44505* (2013.01); *G06F 9/5072* (2013.01); *G06F 2209/5011* (2013.01)

(58) Field of Classification Search
CPC .. G06F 9/5027; G06F 9/44505; G06F 9/5072; G06F 2209/5011; G06F 9/5077; G06F 2209/505
See application file for complete search history.

(56) References Cited

U.S. PATENT DOCUMENTS

| | | | |
|---|---|---|---|
| 6,889,253 | B2 | 5/2005 | Griffin et al. |
| 8,126,843 | B2 | 2/2012 | Mckenney et al. |
| 8,145,759 | B2 | 3/2012 | Bhogi et al. |
| 2016/0078116 | A1* | 3/2016 | Alewine ................. G06F 16/27 707/615 |
| 2019/0317789 | A1* | 10/2019 | Chakraborty ....... G06F 9/45558 |
| 2020/0379880 | A1* | 12/2020 | Rodrigues Rosa Junior ............... G06F 11/3616 |
| 2021/0368009 | A1 | 11/2021 | Gopinath et al. |
| 2022/0094690 | A1* | 3/2022 | Tarkhanyan ............ G06F 9/505 |

FOREIGN PATENT DOCUMENTS

| | | |
|---|---|---|
| CN | 111026565 A | 4/2020 |
| CN | 111984470 A | 11/2020 |
| CN | 113886515 A | 1/2022 |

OTHER PUBLICATIONS

Li, et al; "The Serverless Computing Survey: A Technical Primer for Design Architecture"; vol. 1., No. 1, Science and Engineering, Shanghai Jiao Tong University; Jan. 3, 2022; (35 pages).

* cited by examiner

*Primary Examiner* — Kenneth Tang
(74) *Attorney, Agent, or Firm* — Kilpatrick Townsend & Stockton LLP

(57) ABSTRACT

Systems and methods are disclosed for replacing stale clusters in a cluster pool. An example method includes changing a configuration status of a resource pool managed by a resource pool manager from a first configuration to a second configuration. The resource pool may comprise a plurality of clusters. A portion of the plurality of clusters may be configured according to the first configuration and may store a first hash encoding configuration fields for the first configuration. The resource pool manager device may procure, at predetermined periods until a discontinuation cue, new clusters to include as part of the resource pool. Each new cluster procured at each predetermined period can be configured according to the second configuration. A second hash encoding configuration fields for the second configuration may be stored in each new cluster. Clusters that are not storing the second hash may be deleted from the resource pool.

20 Claims, 4 Drawing Sheets

REPLACING STALE CLUSTERS IN A CLUSTER POOL

BACKGROUND

A resource pool is a collection of resources (e.g., connected devices and/or their physical or virtual components) that can be kept ready for use. Furthermore, a resource pool maintains at least a predetermined or threshold number of interchangeable resource units ready for use. A client (e.g., a consumer) may request (e.g., claim) a resource unit from the pool, for example, to perform a desired operation. The resource unit may be supplied to the client without delay. Another resource unit may be created, while the client is borrowing the requested resource unit) to fill the gap in the resource pool. An administrator of the resource pool can tune the pool size based on, for example, the cost of maintaining a resource unit in a ready state, a time it takes to create a resource unit from scratch, or the expected frequency of requests for resource units. Optimally, the resource pool would always finish creating a unit just-in-time when (e.g., immediately before) a request for the resource unit is received. The just-in-time production of new resource units ensures that there is minimal to no delay in supplying the requested resource unit to the client, and that newly formed resource units spend near-zero time idling in the resource pool and unnecessarily consuming resources.

Red Hat's HIVE CLUSTERPOOLS is an example of a resource pool comprising RED HAT's OPENSHIFT clusters as resource units. OPENSHIFT clusters allow enterprise developers to test platforms and applications at different development phases.

SUMMARY

The present disclosure provides new and innovative systems and methods for replacing stale clusters in a cluster pool. In an example, a method includes receiving, by a resource pool manager device having a processor, a change request to change a configuration status of a resource pool managed by the resource pool manager. The resource pool may comprise a plurality of clusters. The configuration status of the resource pool may be set to a first configuration at least before the change request is received. Furthermore, at least a portion of the plurality of clusters may be configured according to the first configuration and may store a first hash encoding a subset of configuration fields for the first configuration. The method may further comprise setting, based on the change request, the configuration status of the resource pool to a second configuration. The resource pool manager device may procure, at each of a plurality of predetermined periods until a discontinuation cue, a preset number of new clusters to include as part of the resource pool. Each preset number of new clusters procured at each predetermined period can be configured according to the second configuration. A second hash encoding a subset of configuration fields may be generated for the second configuration, and may be stored in each procured new cluster. Furthermore, one or more clusters may be deleted from the resource pool based on the one or more clusters not storing the second hash.

In some embodiments, the discontinuation cue may be based on at least the portion of the plurality of clusters of the resource pool no longer comprising, after the discontinuation cue, clusters configured according to the first configuration. Also or alternatively, the discontinuation cue may be based on at least the portion of the plurality of clusters of the resource pool comprising, after the discontinuation cue, clusters configured according to the second configuration.

In some embodiments, the method may further include: receiving, by the resource pool manager device, a second change request to the configuration status of the resource pool; and setting, based on the second change request, the configuration status of the resource pool to a third configuration. The discontinuation cue may be based on setting the configuration status of the resource pool to the third configuration. Furthermore, the resource pool manager device may procure, at each of the plurality of predetermined periods until a second discontinuation cue, a second preset number of new clusters to include as part of the resource pool. Each of the second preset number of new clusters procured at each predetermined period may be configured according to the third configuration. The method may further include: generating a third hash encoding a subset of configuration fields for the third configuration; storing, in each procured new cluster of the second preset number of new clusters, the third hash; and deleting, from the resource pool, based on another one or more clusters not storing a third hash encoding a subset of configuration fields for the third configuration, the another one or more clusters.

In an example, a system for replacing stale clusters in a resource pool is disclosed. The system may include a resource pool manager device configured to manage a resource pool comprising a plurality of clusters. The resource pool manager device may include a processor and a memory storing computer-executable instructions. When the instructions are executed by the processor, the instructions cause the processor to: receive a change request to a configuration status for the resource pool. The configuration status of the resource pool may be set to a first configuration at least before the change request is received. At least a portion of the plurality of clusters may be configured according to the first configuration and may store a first hash encoding a subset of configuration fields for the first configuration. The instructions, when executed, may further causes the processor to set, based on the change request, the configuration status of the resource pool to a second configuration; and procure, at each of a plurality of predetermined periods until a discontinuation cue, a preset number of new clusters to include as part of the resource pool. Each preset number of new clusters procured at each predetermined period is configured according to the second configuration. The instructions, when executed, may further cause the processor to generate a second hash encoding a subset of configuration fields for the second configuration; store, in each procured new cluster, the second hash; and delete, from the resource pool, based on one or more clusters not storing the second hash, the one or more clusters.

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
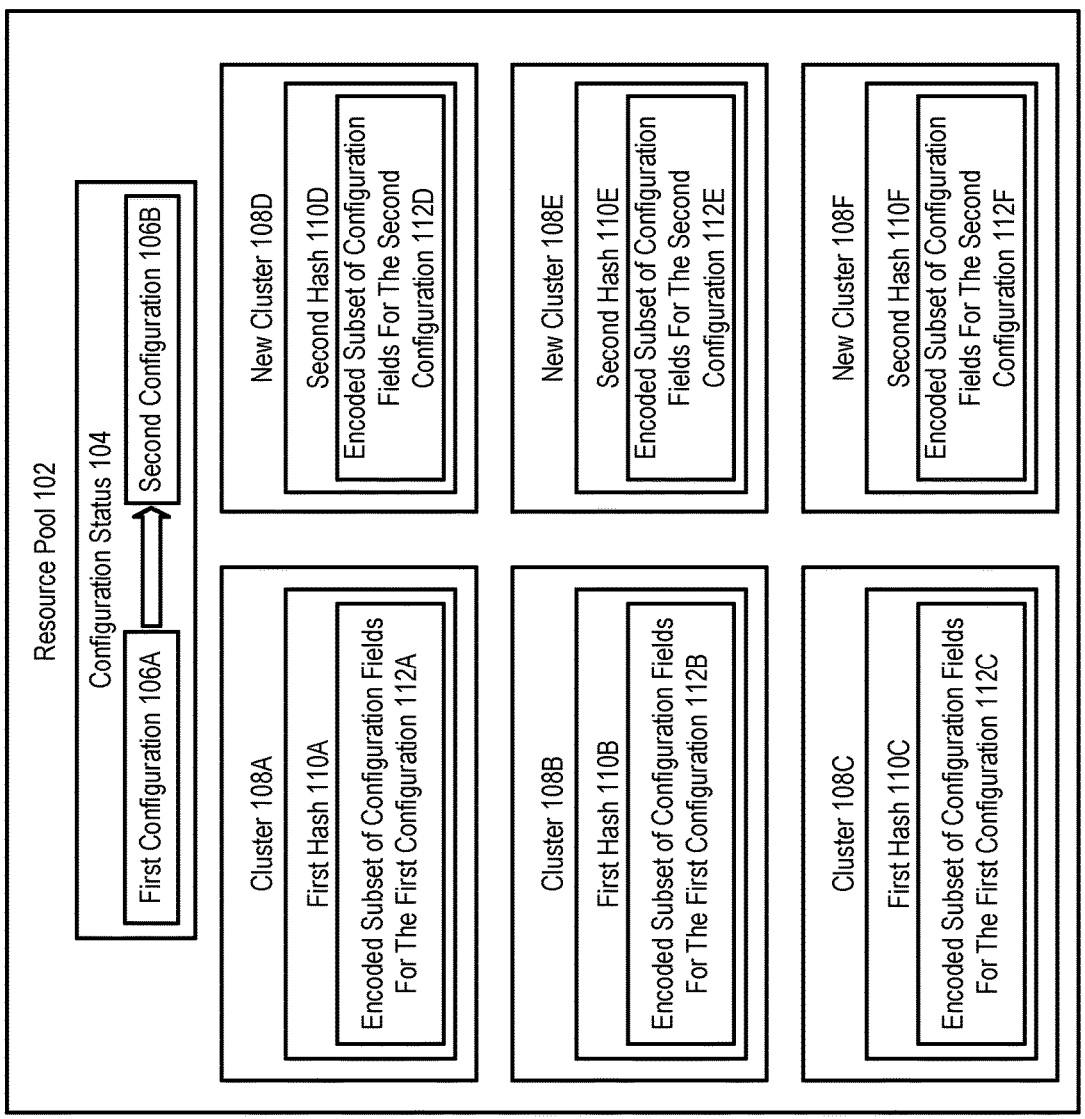
FIG. 1 is a block diagram of an example computer network environment for replacing stale clusters in a resource pool, according to an example embodiment of the present disclosure.
Figure 1:
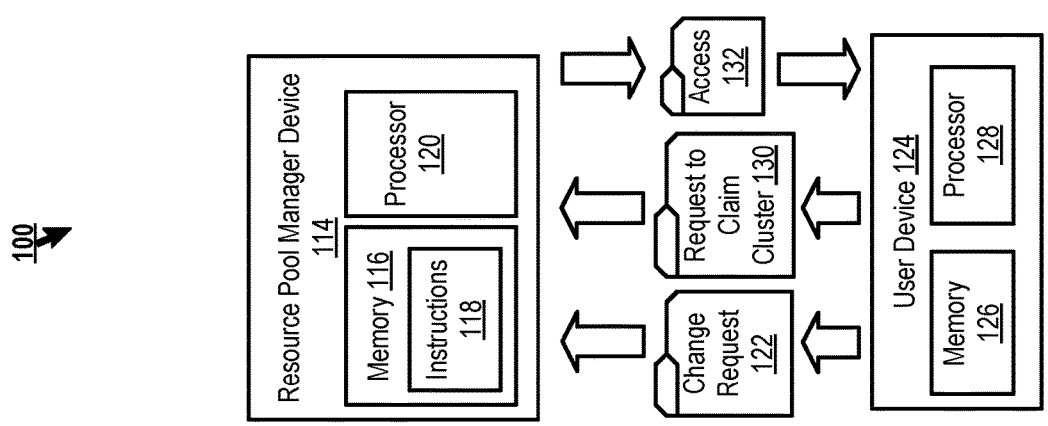

As previously discussed, a resource pool maintains at least a predetermined or threshold number of resource units (e.g., clusters) ready for use. In an optimal setting, each resource unit of a resource pool is intended to be interchangeable with other resource units because each resource unit of the resource pool would be configured according to the configuration assigned to the resource pool (e.g., by an administrator). In practice, however, not all resource units (e.g., clusters) of a resource pool would have the current configuration assigned to the resource pool. For example, after a resource pool has been assigned a new configuration from an older configuration, stale resource units may continue to have the older configuration of the resource pool, as these stale resource units were created before the resource pool was switched to the new configuration. Even though a resource pool manager may change the configuration status of a resource pool to a new configuration, the actual contents of the resource pool (e.g., the resource units) can only reflect the new configuration once the resource pool manager to has created new resource units (e.g., clusters) configured to the new configuration. The new resource units having the new configuration are typically created in response to a deletion or a claiming (e.g., obtaining by users) of existing resource units in the resource pool. Furthermore, the resource pool may need to maintain the availability of a sufficient number of resource units (e.g., pool size) for users, even if they are stale resource units, in order to not deny (e.g., starve) a user a resource unit when requested by the user. This reality makes providing resource units (e.g., supplying responsive to a user request) particularly difficult after a change in the configuration assigned to the resource pool.

Since a change in the configuration status of the resource pool does not necessarily mean an immediate change in the contents of the resource pool, a user seeking to obtain a resource unit from the resource pool may be "lied to" by the configuration status presented to the user as the configuration may not reflect the actual configuration of the resource units comprising the resource pool. Since resource units are typically provided to a user in a first-in-first-out (FIFO) manner, a user seeking to claim (e.g., obtain) resource units having the latest configuration from a resource pool may receive stale resource units first. The resource pool administrator of the pool may have the option to manually refresh the resource pool (e.g. by manually deleting the clusters in the pool and/or by scaling down the resource pool size to zero and rescaling back up). But this process is not optimal, as the resource pool administrator is burdened with having to refresh the resource pool. In cases where a resource pool performs a wholesale deletion of its resource units after a new configuration is assigned (e.g., to delete stale resource units), users requesting resource units from the resource pool may be starved (e.g., denied any resource units) while the resource pool is refilling. While this starvation may be acceptable and necessary if the configuration change is significant (e.g., to the users of the resource pool), the users would be less willing to starve for other types of configuration changes; in the event of the latter, the users may be given stale resource units (having an older configuration) while the resource pool is being refreshed, thus leading to a suboptimal service to users.

Various embodiments of the present disclosure address one or more of the above described shortcomings. For example, systems and methods for replacing stale clusters in a resource pool are disclosed that reduce any starvation time for a user when the user requests a cluster from a resource pool that has recently been assigned a new configuration, while improving the ability of the resource pool to update its clusters to the new configuration more efficiently. While such systems and methods are disclosed with respect to a resource pool comprising clusters (e.g., OPENSHIFT clusters) as the resource unit (and, as such, the resource pool may be referred to herein as cluster pool), it is contemplated that systems and methods disclosed herein may apply to other types of resource units in a resource pool. As used herein, a user may refer to a consumer of the resource pool's resource units, and typically only have the ability to claim (e.g., obtain) units. A user may be distinguishable from an administrator, which, as used herein may control the resource pool configuration and may have the authority to perform administrative tasks (e.g., deleting resource units and/or scaling the resource pool). An example method applied by a resource pool manager device for a resource pool undergoing a change in a configuration status from an older configuration (e.g., first configuration) to a new configuration (e.g., second configuration) may involve generating and storing, in each cluster, a hash indicating the configuration of the cluster. The hash may be stored as each cluster is created. For example, when a new cluster is formed based on the second configuration, the hash stored in the new cluster may indicate that the new cluster is of the second configuration. In contrast, other clusters (e.g., stale clusters formed prior to the change) may store hashes indicating the first configuration. Furthermore, the hash may be based on a subset of configuration fields of a configuration. The subset may be determined by selecting configuration fields deemed pertinent to the configuration of the clusters in the resource pool. In some embodiments, the hash need not be decoded before a comparison is made. For example, the hash stored in any given cluster may simply be compared to the hash that is known and stored by the resource pool manager as denoting the desired (e.g., second) configuration in order to determine whether the given cluster needs to be maintained or deleted.

At each of a plurality of predetermined periods and/or event triggers (e.g., resource pool configuration status change events), the resource pool manager device may retrieve and compare the hash stored in each of a preset number of clusters in the resource pool with the hash corresponding to the second configuration (e.g., based on the predetermined subset of pertinent configuration fields for the second configuration). If the hash stored in a given cluster does not match the hash corresponding to the second configuration (e.g., the hash stored in the given cluster corresponds to the first configuration), the given cluster may be deemed to be a stale cluster. The resource pool manager device can thus delete a number (e.g., based on a tunable or preset maximum) of stale clusters after identifying the mismatch. The deletion may cause the creation of new clusters having the new (e.g., second) configuration. In contrast, if the hash of the given cluster is found to match the hash of the second configuration, the given cluster may be deemed to be a cluster have the correct configuration and can thus be maintained (e.g., until the next change in configuration status of the resource pool).

FIG. 1 is a block diagram of an example computer network environment 100 for replacing stale clusters in a resource pool, according to an example embodiment of the present disclosure. The computer network environment 100 may include a resource pool manager device 114, a resource pool 102 comprising a plurality of clusters (e.g., clusters 108A-108C, new clusters 108D-108F), and a user device 124 associated with a user (e.g., consumer) of the resource pool 102. The resource pool manger device 114 may be configured to manage the resource pool 102. The resource pool manager device 114 may comprise a memory 116 and a processor 120. The memory 116 may store instructions 118 that, when executed by the processor, can cause the processor to perform one or more processes described herein.

For example, the instructions 118, when executed, may cause the processor 120 to receive a change request 122 to a configuration status 104 for the resource pool 102. The configuration status 104 of the resource pool 102 may be set to a first configuration 106A at least before the change request 122 is received. At least a portion of the plurality of clusters may be configured according to the first configuration 106A, (e.g., clusters 108A-108C may be configured according to the first configuration 106A), and may store a first hash (e.g., first hash 110A-110C, respectively) encoding a subset of configuration fields for the first configuration (e.g., encoded subset of configuration fields for the first configuration 112A-112C, respectively). Based on the change request 122, the configuration status 104 of the resource pool 102 can be set to a second configuration 106B.

The instructions 118, when executed, may also cause the processor 120 to procure, at each of a plurality of predetermined periods until a discontinuation cue, a preset number of new clusters (e.g., new clusters 108D-108F) to include as part of the resource pool 102. Each preset number of new clusters (e.g., new clusters 108D-108F) procured at each predetermined period may be configured according to the second configuration. A second hash (e.g., second hash 110D-110F for new clusters 108D-108F, respectively) may be generated encoding a subset of configuration fields for the second configuration 106B (e.g., encoded subset of configuration fields for the second configuration 112D-112F, respectively). The second hash may be stored in each procured new cluster (e.g., second hash 110D-110F stored in new clusters 108D-108F, respectively). Furthermore, one or more clusters (e.g., clusters 108A-108C) may be deleted from the resource pool 102 based on the one or more clusters not storing the second hash (e.g., clusters 108A-108C not storing the second hash).

In some aspects, the resource pool manager device 114 may receive (e.g., after the procuring of new clusters 108D-108F), a request to claim a cluster from the resource pool (e.g., request to claim cluster 130). The request may be received from the user device 124. In some aspects, the user device 124 may comprise any general computing device (e.g., a laptop, tablet, smartphone, etc.), or special purpose computing device associated with the user and configured to be able to access, operate, and/or test application or software on clusters of the resource pool 102. The instructions 118, when executed, may cause the processor 120 to provide, to the user device 124, access 132 to the cluster. The cluster may be configured according to one of the first configuration 106A (e.g., any one of clusters 108A-108C) or the second configuration 106B (any one of new clusters 108D-108F). It is to be appreciated that as the aforementioned deletion process occurs, there may be less and less of clusters having the first configuration 106A in the resource pool 102. In some embodiments, the receiving of the request to claim cluster 130 and the providing of the access 132 may occur in real-time.

Figure 2:
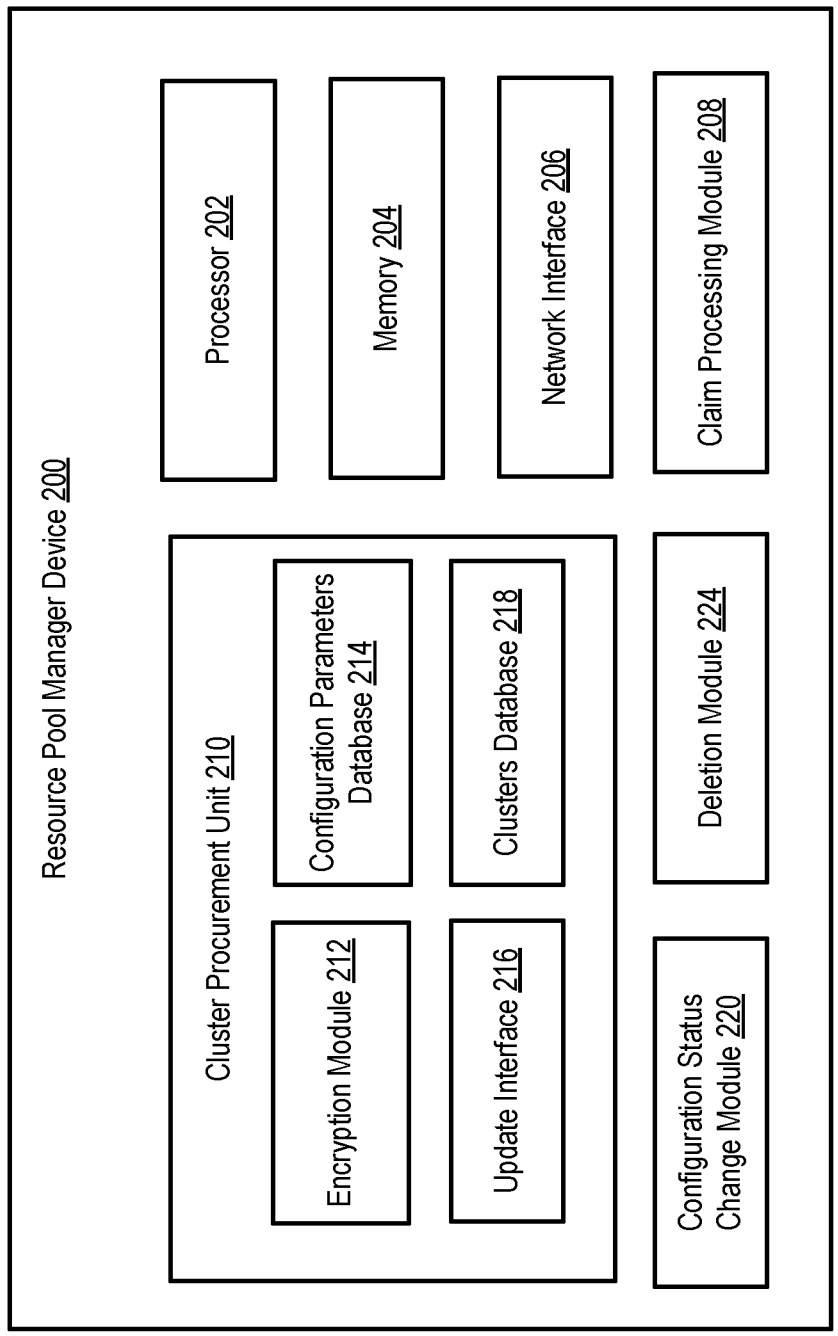
FIG. 2 is a block diagram showing one or more components of an example resource pool manager device, according to an example embodiment of the present disclosure.

FIG. 2 is a block diagram showing one or more components of an example resource pool manager device 200, according to an example embodiment of the present disclosure. Furthermore, resource pool manager device 200 shown may comprise the resource pool manager device 114 and may include one or more components and perform one or more functions previously described and attributed to resource pool manager device 114. In some aspects, the resource pool manager device 200 may be one or more of a remote or local server, a computing device (e.g., a laptop, tablet, smartphone, etc.), a special purpose computer, or another cluster or resource unit tasked to perform functions of the resource pool administrator. As shown in FIG. 2, the resource pool manager device 200 may comprise one or more of a processor 202 (e.g., processor 120), a memory 204 (e.g., memory 116), a network interface 206, a claim processing module 206, a cluster procurement unit 210, a configuration status change module 220, and a deletion module 224.

The processor 202 may comprise any one or more types of digital circuit configured to perform operations on a data stream, including functions described in the present disclosure. The memory 204 may comprise any type of long term, short term, volatile, nonvolatile, or other memory and is not to be limited to any particular type of memory or number of memories, or type of media upon which memory is stored. Furthermore, the memory 204 may store computer-executable instructions (e.g., instructions 118) that, when executed by the processor 202, can cause the processor 202 to perform one or more processes described herein. The network interface 206 may allow the resource pool manager device 200 to communicate with other systems (e.g., user device 124, clusters 108A-108C, new clusters 108D-108F, etc.) over a communication network. For example, the network interface 206 may comprise a wired interface (e.g., electrical, RF (via coax), optical interface (via fiber)), a wireless interface, a modem, etc.

The claim processing module 208 may comprise any portion or entirety of a software, application, program, or plug-in that causes the resource pool manager device 200 to receive requests from a user device (e.g., user device 124) to access (e.g., claim) a cluster (e.g., request to claim cluster 130). Furthermore, the claim processing module 208 may cause the resource pool manager device 200 to execute on the request (e.g., by retrieving a cluster from the resource pool 102; and providing, to the user device 124, access 132 to the cluster).

The deletion module 224 may comprise any portion or entirety of a software, application, program, or plug-in that causes the resource pool manager device 200 to delete a cluster from the resource pool (e.g., stale clusters 108A-108B from resource pool 102). In some embodiments, the resource pool manager device 114 may set how many clusters to delete at a given time.

The configuration status change module 220 may comprise any portion or entirety of a software, application, program, or plug-in that causes the resource pool manager device 200 to set or change the configuration status of the resource pool 102. The configuration status may indicate or advertise (e.g., to users via their respective user devices) what the configuration of the clusters comprising the resource pool is supposed to be or may eventually be (e.g., after any stale clusters have been replaced). For example, a user desiring to obtain a cluster of a certain configuration may search for resource pools which have the certain configuration, and may send a request to claim a cluster from one of those resource pools.

The cluster procurement unit 210 may comprise a software and/or a hardware unit comprising one or more subcomponents that cause (e.g., via computer executable instructions and/or circuitry) the resource pool manager device 200 to procure (e.g., create) new clusters in the resource pool 102 based on a configuration, generate and store hashes indicating the configuration, and maintain records of the clusters in the resource pool 102. For example, the encryption module 212 may comprise a software, application, program, or plug-in used for generating a hash (e.g., a checksum) from one or more configuration parameters of a configuration set for the resource pool. The update interface 216 may comprise a software, application, program, or plug-in used for updating the resource pool by creating a new cluster having a specific configuration, and updating the relevant databases (e.g., configuration parameters database 214 and clusters database 218) to reflect the creation. The configuration parameters database 214 may store a repository of various configurations and their respective configuration parameters, including the current configuration of the resource pool set by the configuration status change module 220. Example configuration parameters may include, but are not limited to, for example, a resource pool size, a release time, a hardware capability (CPU speed, memory, etc.), a platform (e.g., a cloud provider (e.g., AWS, GCP, AZURE, etc.), a platform-specific setting (e.g., a region of AWS), a base, a domain, a template, etc. The clusters database 218 may store a record of all clusters in the resource pool 102 (e.g., by a cluster identification). Furthermore, the clusters database 218 may link each cluster to a configuration (e.g., after a comparison of the hash stored in each cluster to a hash associated with a current configuration of the resource pool) to quickly identify which clusters are stale and need to be deleted.

Figure 3:
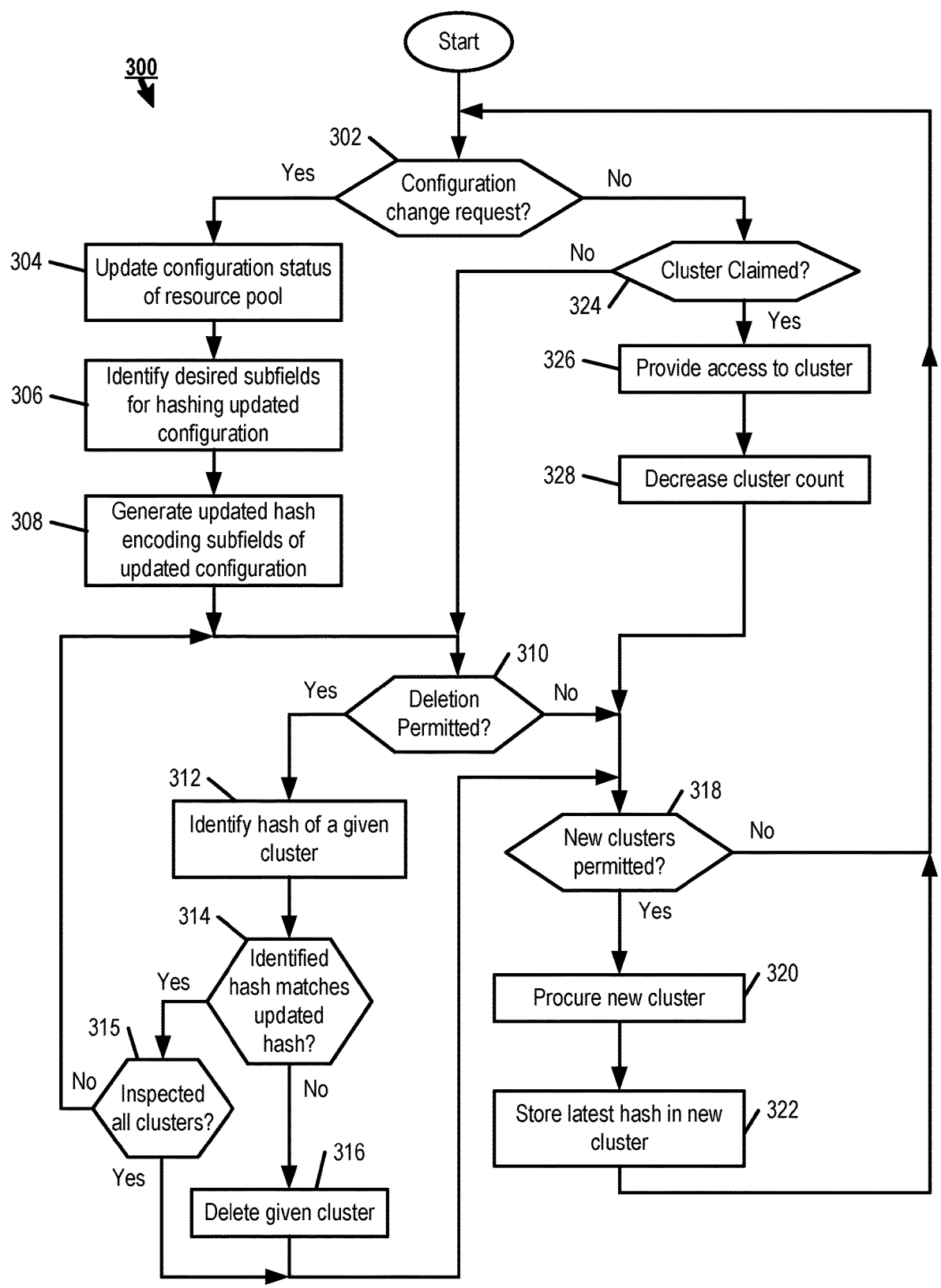
FIG. 3 is a flow chart illustrating an example process for replacing stale clusters in a resource pool, according to an example embodiment of the present disclosure.

FIG. 3 is a flow chart illustrating an example process 300 for replacing stale clusters in a resource pool, according to an example embodiment of the present disclosure. In some embodiments, one or more blocks of process 300 may be performed by the resource pool manager device (hereinafter "RPMD") 114/200 (e.g., via the processor 120/202 based on instructions 118 stored in memory 116/204). Process 300 may begin with the RPMD determining whether a configuration change request is received (block 302). For example, an operator or administrator of the resource pool may, via input to the RPMD, request a change in the configuration of the RPMD, and cause the change to be effectuated via the configuration status change module 220. The configuration change request may include the desired configuration, which may indicate, or cause the RPMD to retrieve information for, the configuration parameters associated with the configuration. Furthermore, the configuration change request may indicate which of these configuration parameters are crucial and/or most desired (e.g., for the purpose of hashing as described herein).

If a configuration change request is received, the configuration status of the resource pool may be updated (block 304). For example, the configuration status change module 220 may present (e.g., to users) the configuration of the configuration change request. Furthermore, the RPMD may identify (e.g., using the received configuration change request) the desired configuration parameters for the configuration in order to hash subfields corresponding to the desired configuration parameters for the configuration (block 306). For example, if the configuration parameters for a configuration may be represented as a field comprising values A, B, and C, and the desired or crucial configuration parameters correspond to subfields B and C, then the subfields B and C may be hashed. At block 308, the RPMD may generate a hash encoding the subfields of the updated configuration. The hash may be an update to an earlier hash being used to denote subfields of desired configuration parameters of an earlier configuration. Therefore, the instant hash replacing the earlier hash may be referred to as the updated hash.

Furthermore, the RMPD may perform a process of inspecting, deleting, and procuring clusters (blocks 310 through 322). In some embodiments the process may begin after the RPMD has generated and stored the updated hash corresponding to the updated configuration. At block 310, the RMPD may determine whether deletion of clusters is permitted. For example, in order to prevent the possibility of starving (e.g., denying) users of any clusters when requested (even stale clusters (clusters having older undesired configurations)), the RPMD may restrict deletion to a preset number of clusters at a given time or predetermined period.

If deletion is permitted, the RPMD may identify the hash of a given cluster (block 312). Upon identification, the RPMD may determine whether the identified hash matches the updated hash (block 314). If there is a match, the given cluster may be maintained, as its configuration reflects the current configuration set for the resource pool. However, until the RPMD has inspected all clusters (block 315), blocks 310 through 315 may be repeated, for example, to compare the hashes stored in the remaining clusters to the updated hash. If there is a mismatch, the RPMD may delete the given cluster (block 316), since deletion is permitted.

In order to procure new clusters, the RPMD may determine whether, at the time, new clusters are permitted to be procured (block 318). For example, in order to conserve bandwidth, processor usage, and other resources, the RPMD may restrict the number of new clusters that may be formed at a given time or predetermined period to a preset number. If new clusters are permitted, the RPMD may procure a new cluster, in accordance to the updated configuration (block 320). For example, a set of devices, systems, or platforms may be aggregated together to satisfy the configuration parameters corresponding to the updated configuration. At block 322, the RPMD may store the updated hash corresponding to the updated configuration into the new cluster. Also or alternatively, the RPMD may store the cluster ID of the newly created cluster and the updated hash in the clusters database 218 such that the updated hash is mapped to the cluster ID. Afterwards, or if new clusters are not permitted, process 400 may repeat blocks 302 onwards.

The RPMD may also process received requests to access clusters from the resource pool. For example, the RPMD may monitor to see if a cluster has been claimed (e.g., if a request to access a cluster has been received) (block 324). If there is a cluster being claimed, the RPMD may provide, to the user device sending the request, access to cluster (block 326). In some embodiments, the cluster count may be decreased after each cluster is engaged (e.g., accessed by a user device) (block 328). Furthermore, the RPMD may monitor to see if new clusters are permitted to be procured at the time (block 318). If no cluster is being claimed, the RPMD may monitor to see if deletion of clusters is being permitted at the time. In some embodiments, the RPMD may progress to, in any order, process loops triggered by a configuration change request being received (block 302—Yes), a cluster being claimed (block 324—Yes), deletion of clusters being permitted (block 310—Yes), and/or procurement of new clusters being permitted (block 318—Yes).

Figure 4:
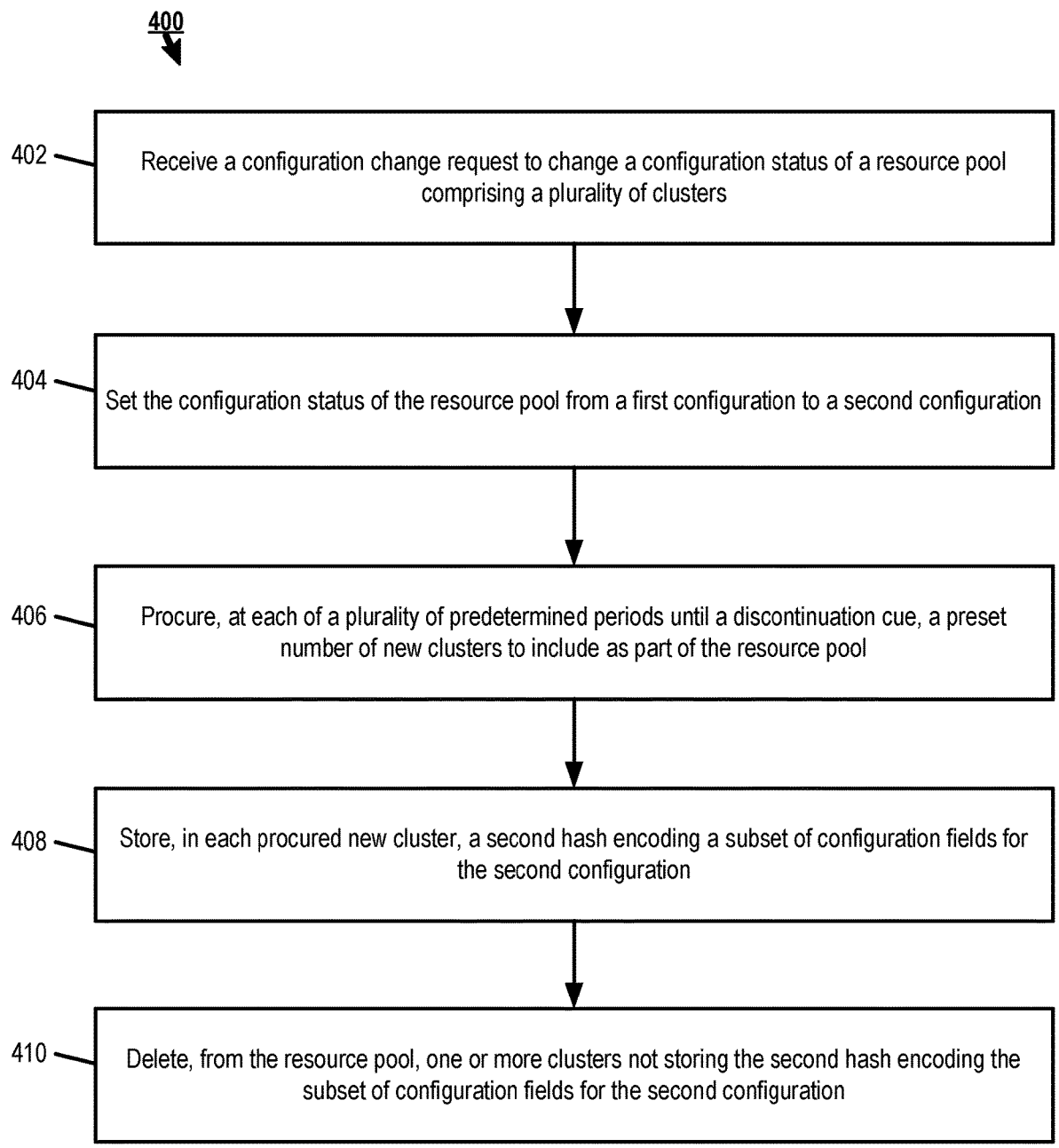
FIG. 4 is a flow chart illustrating an example process performed by a resource pool manager device, according to an example embodiment of the present disclosure.

FIG. 4 is a flow chart illustrating an example process 400 performed by a resource pool manager device, according to an example embodiment of the present disclosure. One or more blocks of process 400 may be performed by the resource pool manager device 114/200 (e.g., via the processor 120/202 based on instructions 118 stored in memory 116/204). Process 400 may begin with the RPMD receiving a configuration change request to change a configuration status of a resource pool (e.g., resource pool 102) comprising a plurality of clusters (block 402). For example, an operator or administrator of the resource pool may, via input to the RPMD, request a change in the configuration of the RPMD, and cause the change to be effectuated via the configuration status change module 220. The configuration status of the resource pool may be set to an existing configuration (first configuration) at least before the change request is received. Furthermore, at least a portion of the plurality of clusters may be configured according to the first configuration and may store a first hash encoding a subset of configuration fields for the first configuration.

The RPMD may, in response to the configuration change request, set the configuration status of the resource pool from its existing configuration (first configuration) to a new configuration requested in the configuration change request (second configuration) (block 404). For example, the configuration status change module 220 may cause the RPMD to present (e.g., to users) the resource pool as having the second configuration.

The RPMD may procure (e.g., via cluster procurement unit 210) a preset number of new clusters to include as part of the resource pool (block 406). Furthermore, the preset number of new clusters may be procured at each of a plurality of predetermined periods until a discontinuation cue. Each preset number of new clusters procured at each predetermined period may be configured according to the second configuration. In some embodiments, the discontinuation cue may be based on one or both of: at least the portion of the plurality of clusters of the resource pool no longer comprising, after the discontinuation cue, clusters configured according to the first configuration; or at least the portion of the plurality of clusters of the resource pool comprising, after the discontinuation cue, clusters configured according to the second configuration. Also or alternatively, the discontinuation cue may be a subsequent setting of the configuration status of the resource pool to yet another configuration (e.g., third configuration). In some embodiments, each predetermined period may begin at one or both of a completion of the deletion at a previous predetermined period or a completion of the procuring at the previous predetermined period.

The RPMD may store, in each procured new cluster, a second hash encoding a subset of configuration fields for the second configuration (bock 408). For example, the RPMD may generate a hash encoding one or more subfields corresponding to one or more configuration parameters (subset of configuration fields) of the second configuration.

The RPMD may delete, from the resource pool, one or more clusters not storing the second hash encoding the subset of configuration fields for the second configuration (block 410). For example, the RPMD may retrieve the respective hash for each of a second preset number of clusters of the resource pool. The RPMD may then compare the respective hash of each of the second preset number of clusters to the second hash. Based on the comparison, the RPMD may determine that a subset of the second preset number of clusters are not configured according to the second configuration. The one or more clusters being deleted may correspond to the subset of the second preset number of clusters not configured according to the second configuration.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A method comprising:
   receiving, by a resource pool manager device having a processor, a change request to change a configuration status of a resource pool managed by the resource pool manager device, wherein the resource pool comprises a plurality of clusters, wherein the configuration status of the resource pool is set to a first configuration at least before the change request is received, wherein at least a portion of the plurality of clusters are configured according to the first configuration and store a first hash encoding a subset of configuration fields for the first configuration;
   setting, based on the change request, the configuration status of the resource pool to a second configuration;
   adding, by the resource pool manager device, at each of a plurality of predetermined periods until a discontinuation cue, a preset number of new clusters to include as part of the resource pool, wherein each preset number of new clusters added at each predetermined period are configured according to the second configuration;
   generating a second hash encoding a subset of configuration fields for the second configuration;
   storing, in each added new cluster, the second hash; and
   deleting, from the resource pool, based on one or more clusters of the plurality of clusters not storing the second hash, the one or more clusters.

2. The method of claim 1, wherein the discontinuation cue is based on one or both of:

at least the portion of the plurality of clusters of the resource pool no longer comprising, after the discontinuation cue, clusters configured according to the first configuration, or at least the portion of the plurality of clusters of the resource pool comprising, after the discontinuation cue, clusters configured according to the second configuration.

3. The method of claim 1, further comprising:

receiving, by the resource pool manager device, a second change request to the configuration status of the resource pool;

setting, based on the second change request, the configuration status of the resource pool to a third configuration,
wherein the discontinuation cue is based on setting the configuration status of the resource pool to the third configuration;

procuring, by the resource pool manager device, at each of the plurality of predetermined periods until a second discontinuation cue, a second preset number of new clusters to include as part of the resource pool, wherein each of the second preset number of new clusters added at each predetermined period are configured according to the third configuration;

generating a third hash encoding a subset of configuration fields for the third configuration;

storing, in each added new cluster of the second preset number of new clusters, the third hash; and deleting, from the resource pool, based on another one or more clusters not storing a third hash encoding a subset of configuration fields for the third configuration, the another one or more clusters.

4. The method of claim 1, further comprising, prior to the deleting:

retrieving, by the resource pool manager device, a hash for each of a second preset number of clusters of the resource pool;

comparing, by the resource pool manager device, the hash of each of the second preset number of clusters to the second hash; and determining, based on the comparison, that a subset of the second preset number of clusters are not configured according to the second configuration, wherein deleting the one or more clusters comprises deleting the subset of the second preset number of clusters.

5. The method of claim 1,
wherein deleting the one or more clusters occurs at each of the plurality of predetermined periods until the discontinuation cue, and
wherein, at each predetermined period, the deleted one or more clusters are in the same number as the preset number of new clusters added at the predetermined period.

6. The method of claim 5, wherein each predetermined period begins at one or both of a completion of the deletion at a previous predetermined period or a completion of the adding at the previous predetermined period.

7. The method of claim 1, further comprising, after the adding:

receiving, by the resource pool manager device and from a user device, a request to claim a cluster from the resource pool; and providing, to the user device, access to the cluster, wherein the cluster is configured according to one of the first configuration or the second configuration,
wherein receiving the request and providing the access occur in real-time.

8. The method of claim 1, wherein the subset of configuration fields for the second configuration is determined based on the change request.

9. A system comprising:

a resource pool manager device configured to manage a resource pool comprising a plurality of clusters, wherein the resource pool manager device comprises a memory and a processor, wherein the memory stores instructions that, when executed by the processor, cause the processor to:

receive a change request to a configuration status for the resource pool, wherein the configuration status of the resource pool is set to a first configuration at least before the change request is received, wherein at least a portion of the plurality of clusters are configured according to the first configuration and store a first hash encoding a subset of configuration fields for the first configuration;

set, based on the change request, the configuration status of the resource pool to a second configuration;

add, at each of a plurality of predetermined periods until an discontinuation cue, a preset number of new clusters to include as part of the resource pool, wherein each preset number of new clusters added at each predetermined period is configured according to the second configuration;

generate a second hash encoding a subset of configuration fields for the second configuration;

store, in each added new cluster, the second hash; and delete, from the resource pool, based on one or more clusters of the plurality of clusters not storing the second hash, the one or more clusters.

10. The system of claim 9, wherein the discontinuation cue is based on one or both of:

at least the portion of the plurality of clusters of the resource pool no longer comprising, after the discontinuation cue, clusters configured according to the first configuration, or at least the portion of the plurality of clusters of the resource pool comprising, after the discontinuation cue, clusters configured according to the second configuration.

11. The system of claim 9, wherein the instructions, when executed, further cause the processor to:

receive a second change request to the configuration status of the resource pool; and set, based on the second change request, the configuration status of the resource pool to a third configuration,
wherein the discontinuation cue is based on setting the configuration status of the resource pool to the third configuration;

add, at each of the plurality of predetermined periods until a second discontinuation cue, a second preset number of new clusters to include as part of the resource pool, wherein each of the second preset number of new clusters added at each predetermined period are configured according to the third configuration;

generate a third hash encoding a subset of configuration fields for the third configuration;

store, in each added new cluster of the second preset number of new clusters, the third hash; and delete, from the resource pool, based on another one or more clusters not storing a third hash encoding a subset of configuration fields for the third configuration, the another one or more clusters.

12. The system of claim 9, wherein the instructions, when executed, further cause the processor to, prior to the deleting:
- retrieve a hash for each of a second preset number of clusters of the resource pool;
- compare the hash of each of the second preset number of clusters to the second hash; and
- determine, based on the comparison, that a subset of the second preset number of clusters are not configured according to the second configuration, wherein deleting the one or more clusters comprises deleting the subset of the second preset number of clusters.

13. The system of claim 9,
- wherein the deleting the one or more clusters occurs at each of the plurality of predetermined periods until the discontinuation cue,
- wherein, at each predetermined period, the deleted one or more clusters are in the same number as the preset number of new clusters added at the predetermined period, and
- wherein each predetermined period begins at one or both of a completion of the deletion at a previous predetermined period or a completion of the adding at the previous predetermined period.

14. The system of claim 9, wherein the instructions, when executed, further cause the processor to, after the adding:
- receive, from a user device, a request to claim a cluster from the resource pool; and
- provide, to the user device, access of the cluster,
  - wherein the cluster is configured according to one of the first configuration or the second configuration,
  - wherein the receiving the request and the providing the access occur in real-time.

15. The system of claim 9, wherein the subset of configuration fields for the second configuration is determined based on the change request.

16. One or more non-transitory computer readable media storing instructions that, when executed by one or more processors, cause the one or more processors to perform steps comprising:
- receiving, by a resource pool manager device having a processor, a change request to change a configuration status of a resource pool managed by the resource pool manager device, wherein the resource pool comprises a plurality of clusters, wherein the configuration status of the resource pool is set to a first configuration at least before the change request is received, and wherein at least a portion of the plurality of clusters are configured according to the first configuration and store a first hash encoding a subset of configuration fields for the first configuration;
- setting, based on the change request, the configuration status of the resource pool to a second configuration;
- adding, by the resource pool manager device, at each of a plurality of predetermined periods until an discontinuation cue, a preset number of new clusters to include as part of the resource pool, wherein each preset number of new clusters added at each predetermined period are configured according to the second configuration;
- generating a second hash encoding a subset of configuration fields for the second configuration;
- storing, in each added new cluster, the second hash; and
- deleting, from the resource pool, based on one or more clusters of the plurality of clusters not storing the second hash, the one or more clusters.

17. The non-transitory computer readable media of claim 16, wherein the discontinuation cue is based on one or both of:
- at least the portion of the plurality of clusters of the resource pool no longer comprising, after the discontinuation cue, clusters configured according to the first configuration, or
- at least the portion of the plurality of clusters of the resource pool comprising, after the discontinuation cue, clusters configured according to the second configuration.

18. The non-transitory computer readable media of claim 16, the steps further comprising:
- receiving, by the resource pool manager device, a second change request to the configuration status of the resource pool;
- setting, based on the second change request, the configuration status of the resource pool to a third configuration,
  - wherein the discontinuation cue is based on setting the configuration status of the resource pool to the third configuration;
- adding, by the resource pool manager device, at each of the plurality of predetermined periods until a second discontinuation cue, a second preset number of new clusters to include as part of the resource pool, wherein each of the second preset number of new clusters added at each predetermined period are configured according to the third configuration;
- generating a third hash encoding a subset of configuration fields for the third configuration;
- storing, in each added new cluster of the second preset number of new clusters, the third hash; and
- deleting, from the resource pool, based on another one or more clusters not storing a third hash encoding a subset of configuration fields for the third configuration, the another one or more clusters.

19. The non-transitory computer readable media of claim 16, the steps further comprising, prior to the deleting:
- retrieving, by the resource pool manager device, a hash for each of a second preset number of clusters of the resource pool;
- comparing, by the resource pool manager device, the hash of each of the second preset number of clusters to the second hash; and
- determining, based on the comparison, that a subset of the second preset number of clusters are not configured according to the second configuration, wherein deleting the one or more clusters comprises deleting the subset of the second preset number of clusters.

20. The non-transitory computer readable media of claim 16,
- wherein deleting the one or more clusters occurs at each of the plurality of predetermined periods until the discontinuation cue,
- wherein, at each predetermined period, the deleted one or more clusters are in the same number as the preset number of new clusters added at the predetermined period, and
- wherein each predetermined period begins at one or both of a completion of the deletion at a previous predetermined period or a completion of the adding at the previous predetermined period.

* * * * *